United States Patent
Elias et al.

(10) Patent No.: US 9,882,934 B2
(45) Date of Patent: Jan. 30, 2018

(54) SIMPLE TRUSTED TRANSFER TO INTERNET OF THINGS DEVICES

(71) Applicant: Synopsys, Inc., Mountain View, CA (US)

(72) Inventors: Andrew Elias, Ottawa (CA); Derek Bouius, Ottawa (CA); Neil Leckett, Ottawa (CA); Steven Lougheed, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/753,688

(22) Filed: Jun. 29, 2015

(65) Prior Publication Data

US 2016/0381016 A1    Dec. 29, 2016

(51) Int. Cl.
*H04L 9/32*    (2006.01)
*H04L 29/06*    (2006.01)

(52) U.S. Cl.
CPC .................................. *H04L 63/20* (2013.01)

(58) Field of Classification Search
None
See application file for complete search history.

(56) References Cited

U.S. PATENT DOCUMENTS

| | | | | |
|---|---|---|---|---|
| 7,962,749 B2* | 6/2011 | Jones | .................... | G06Q 50/265 713/168 |
| 8,171,483 B2* | 5/2012 | Nord | ..................... | G06F 9/5077 717/120 |
| 8,677,482 B2* | 3/2014 | Buer | ....................... | G06F 21/52 713/170 |
| 2012/0266209 A1* | 10/2012 | Gooding | ................. | H04L 63/20 726/1 |
| 2014/0059013 A1* | 2/2014 | Chao | ..................... | G06F 21/552 707/690 |
| 2015/0149732 A1* | 5/2015 | Kiperberg | ........... | G06F 12/1408 711/139 |

\* cited by examiner

*Primary Examiner* — Brandon Hoffman
(74) *Attorney, Agent, or Firm* — Jaquez Land Greenhaus LLP; Bruce W. Greenhaus, Esq.

(57) ABSTRACT

A system and method for updating multiple devices that are coupled to a network by a hub provides a trusted platform module in each of the devices, sends messages from the network to the hub for updating the devices, sends each of the devices messages from the hub to update the device, executes the content of each message in the device to which that message is sent, and deletes each message after it has been executed. Each of the messages preferably includes trusted code, and the device receiving each message executes the trusted code in the trusted platform module. The trusted code may include an update function, an image, and control data, and preferably has integrity. The hub may receive trusted code from a remote server, execute the trusted code to send a message to one of the devices, and then delete the trusted code.

16 Claims, 2 Drawing Sheets

SIMPLE TRUSTED TRANSFER TO INTERNET OF THINGS DEVICES

FIELD OF THE INVENTION

The present disclosure relates to Internet of Things, reduced size trusted processing devices.

SUMMARY

In accordance with one embodiment, an Internet of Things system comprises a hub coupled to a network for receiving messages from the network, and coupled to one or more devices for sending messages to each of the devices. Each of the devices may execute the content of each received message prior to discarding the message. The message preferably comprises logic and an image to be executed by the device. The message is protected, and the system prevents reverse engineering and changing functions and/or data when using encryption and integrity as the trusted code protection. The system preferably prevents changing functions and/or data when using integrity as the trusted code protection, and strengthens the security of the devices.

In accordance with another embodiment, a method of updating multiple devices that are coupled to a network by a hub comprises providing a trusted platform module in each of the devices, sending messages from the network to the hub for updating the devices, sending each of the devices messages from the hub to update the device, executing the content of each message in the device to which that message is sent, and deleting each message after it has been executed. Each of the messages preferably includes trusted code, and the device receiving each message executes the trusted code in the trusted platform module. The trusted code may include an update function, an image, and control data, and preferably has integrity. The hub may receive trusted code from a remote server, execute the trusted code to send a message to one of the devices, and then delete the trusted code.

Each of the devices includes less memory, less processing capacity, and consumes less power than the hub. Each of the messages can preferably be read by only one of the devices. Each device includes both volatile and non-volatile memory, stores each received message in the volatile memory, and stores only the image in the non-volatile memory. At least the update function in each of the messages is preferably encrypted.

The method may include sending a request to the hub from one of the devices before that device sends data to the hub, and then sending a reply message from the hub to the requesting device, the reply message containing an encryption algorithm to be executed by the device to encrypt data to be sent to the hub. The method may include establishing a secure binding between the hub and each of the devices, and maintaining a binding key in the hub for each of the devices.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
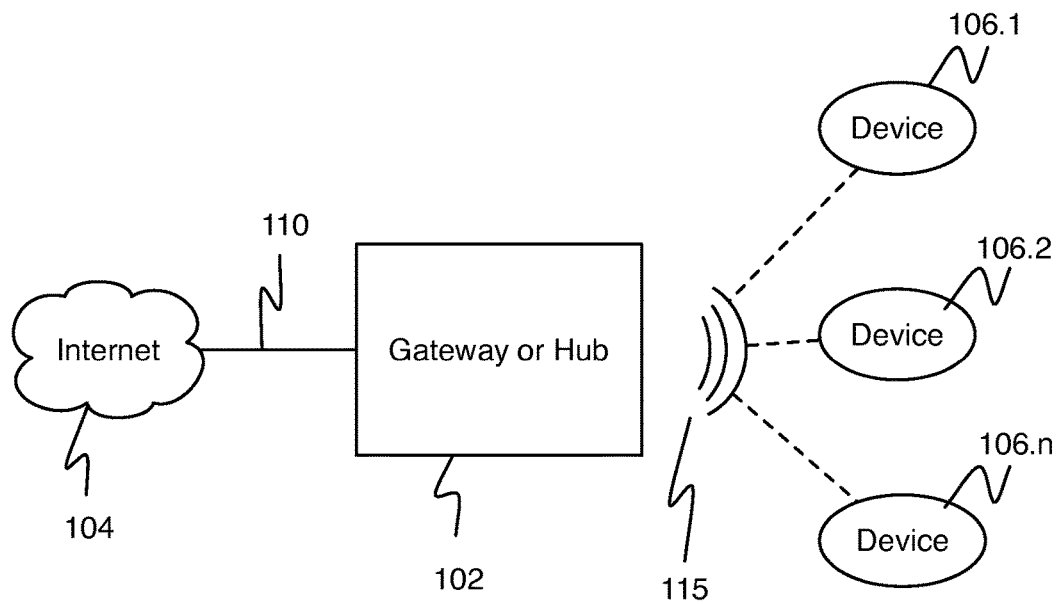
FIG. 1 is an example of an Internet of Things network architecture.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

BACKGROUND

A security perimeter refers to a physical aspect of the system that prevents attackers from accessing confidential information or manipulating data to break intended functionality. A security perimeter can be designed in the hardware, software or using a combination of both. The strength of a security perimeter is measured by its ability to prevent the many known attack scenarios. A proper implementation of a security perimeter should be built upon a trusted framework. Some examples of a trusted framework include secure boot, trusted processor module, etc.

Trusted code is software that can only be executed on a trusted processor module or trusted platform module (TPM). The trusted code protection format generally has encryption and/or integrity built in.

Existing techniques rely on implementing a localized security perimeter on the device. The strength of this security perimeter is dependent on the available resources on the device, which translates to higher cost.

DETAILED DESCRIPTION

The Internet of Things (IoT) is the network of physical objects or "things" embedded with electronics, software, sensors and connectivity to enable it to achieve greater value and service by exchanging data with a manufacturer, operator and/or other connected devices. Each thing is uniquely identifiable through its embedded computing system,. but is able to interoperate within the existing Internet infrastructure. Referring to FIG.1, an IoT architecture generally consists of a gateway or hub 102 in communications with one or more devices 106.1, 106.2 . . . 106.n. The hub communicates with the Internet 104 via a wired or wireless connection 110. The hub generally connects with the device via wireless connectivity 115, but there can also be wired connectivity. The hub is generally a computing system that has a relatively richer feature set compared to the device(s). This includes larger memory, more processing power and a strong security perimeter. The devices are generally cost sensitive modules with a limited set of resources. These limited resources include restricted memory, smaller processor, limited power and a weaker security perimeter compared to the hub. Some examples of devices include a controllable light bulb, a video camera, a sensor, etc.

There is a need to offer a trusted framework on the device and/or hub without increasing the cost or the complexity.

As part of the trust framework, the hub and the device can communicate to each other using trusted code.

The trusted code is protected. The protection can be in the form of encryption and/or integrity.

Figure 2:
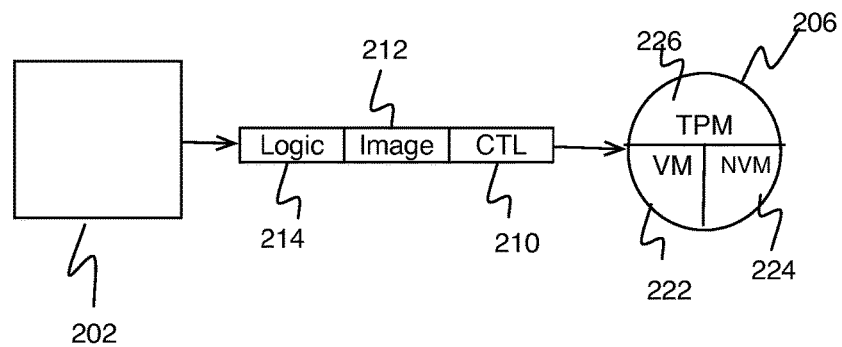
FIG. 2 is an example embodiment of a hub configuring dynamically one or more devices.

In one embodiment, the hub performs a device software/firmware update using trusted software. The device 206 comprises a TPM 226 to execute the trusted code, volatile memory (VM) 222 and non-volatile memory (NVM) 224. The device receives the trusted code (with encryption and integrity) from the hub, executes the trusted code to perform the software/firmware update and then deletes the trusted code. As shown in FIG. 2, the hub 202 generates a message (trusted code) for a selected device 206. The message comprises some control data 210, a software/firmware image 212 and update function 214. The message is protected using a scheme defined by the TPM and that only the selected device 206 can read. When the device 206 receives the message, it stores it in a volatile memory 222. It executes the update function 214 and copies the image to the non-volatile memory 224, possibly overwriting existing images already in the memory. The device then deletes the message.

The update function 214 is completely secure and unobservable. The data is also secure. The update function 214 can support a different update algorithm for every hub to device software/firmware update transaction.

If the device is compromised (outside the update window), it is not possible to determine how the update is made as there is nothing to reverse engineer. Even if the trusted code is observed on the device, the information and update function are encrypted and therefore cannot be read or understood.

Using this embodiment, the weaker security perimeter on the device is enhanced since the functions do not reside permanently on the device. In this example, the interaction between the hub and the device(s) together offer a stronger security perimeter for the system. Without this interaction, a stronger security perimeter implementation on each device is not possible due to cost and resource constraints. A similar reasoning may also apply to the hub.

As another embodiment, if the device wants to send secured data to the hub. The device first sends a request to the hub. The hub replies with a message wherein the image contains the encryption algorithm to execute and the key if applicable. The device executes the image to encrypt the data and sends the encrypted data to the hub. The device deletes the message and the image.

In this example, although the trusted code can be observed in transit, it cannot be read. Therefore the type of encryption used to send the data back to the device is unknown to the attacker observing the secure data from the device to the hub.

With this embodiment, a secure binding can be established between the hub and devices using, for example, each devices serial numbers. The hub maintains a binding key for each device. If the device is stolen no other hubs can bind with it.

If the hub security is compromised, then its software/firmware can be updated. The hub, in turn updates each device with new binding keys.

An attacker can observe back and forth messaging using trusted code but can't read the data hence cannot know what the functions and data are.

Another advantage of the embodiment is that if a device is stolen, there is no software or data to break into since it is deleted as soon as it is executed. Similarly, the software cannot be reverse engineered.

In another embodiment, the hub may receive trusted software/firmware from a cloud base server (internet). Once received, the hub can securely run the software/firmware and delete it once it has completed execution.

The novelty of this technique is to transmit trusted code from one or many devices to another. Once received by the other devices the trusted code is dynamically loaded into memory, executed using a TPM and deleted from the receiving device once the execution is complete. No persistent storage of the trusted code on the receiving device is required. It is possible to observe the trusted code while in transit or on the device. It is not possible view the plain text content or observe the run-time execution of the trusted code since it is protected by the TPM.

The trusted code can contain functions and/or information. Some examples include software updates, secure information, etc.

If the receiving device is compromised it is not possible to reverse engineer the functions or information inside the trusted code if the trusted code can be read from memory. If the device is compromised after the device deletes the trusted code, then there is nothing to reverse engineer on the device. The interaction increased the overall strength of the security perimeter for the device.

The trusted code may only have integrity. In this case, the functions and/or data in the trusted code can be observed but can not be changed. Executing non-confidential function(s) and/or sending non-confidential data from the hub to the device is an example. In this case, it is more important that the integrity of the function(s) and/or the integrity of the data is maintained.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. An Internet of Things system comprising:
a hub coupled to the Internet for receiving messages from a network, and to one or more devices, including a requesting device, for sending hub messages to each of said devices and receiving messages from at least one of the requesting devices,
wherein each of said devices executes the content of each received hub message prior to discarding at least the executed content of the said received hub message; the hub receiving a request from the requesting device before the requesting device sends data to the hub, sending a reply message from the hub to the requesting device, the reply message containing an encryption algorithm to be executed by the requesting device to encrypt the data to the hub.

2. The system of claim 1 where said hub message comprises logic and an image to be executed by the device.

3. The system of claim 1 wherein said hub message is protected.

4. The system of claim 1 which prevents reverse engineering and change functions and/or data when using encryption and integrity as the trusted code protection.

5. The system of claim 1 which prevents changing functions and/or data when using integrity as the trusted code protection.

6. The system of claim 1 which strengthens the security of the devices.

7. A method of updating multiple devices including requesting devices, that are coupled to a network by a hub, said method comprising:
providing a trusted platform module in each of said devices, sending network messages from said network to said hub for updating said devices,
sending each of said messages from said hub to the device to be updated, executing the content of each network message in the device to which that network message is sent,
deleting the executed content of each network message after it has been executed,
receiving within the hub, a request from at least one of the requesting devices before the requested device sends data to the hub, and
in response to the request, sending from the hub a reply message to the requesting device, the reply message containing an encryption algorithm to be executed by the requesting device to encrypt the data to the hub.

8. The method of claim 7 in which each of said network messages includes trusted code, and the device receiving each network message executes the trusted code in said trusted platform module.

9. The method of claim 8 in which said trusted code includes an update function, an image, and control data.

10. The method of claim 9 in which each of said devices includes both volatile and non-volatile memory, stores each received network message in said volatile memory, and stores only said image in said non-volatile memory.

11. The method of claim 9 in which at least said update function in each of said network messages is encrypted.

12. The method of claim 8 in which said hub receives trusted code from a remote server, executes said trusted code to send a network message to one of said devices, and then deletes said trusted code.

13. The method of claim 8 in which said trusted code has integrity.

14. The method of claim 7 in which each of said devices includes less memory, less processing capacity, and consumes less power than said hub.

15. The method of claim 7 in which each of said network message can be read by only one of said devices.

16. The method of claim 7 which includes establishing a secure binding between said hub and each of said devices, and maintaining a binding key in said hub for each of said devices.

* * * * *